United States Patent [19]

Camfield et al.

[11] Patent Number: 5,314,207
[45] Date of Patent: May 24, 1994

[54] BICYCLE WITH SIMULATED MOTORCYCLE PARTS

[75] Inventors: David K. Camfield; Daniel G. Hahn; Duane Niemeyer; Daniel F. Brashear, all of Olney, Ill.

[73] Assignee: Roadmaster Corporation, Olney, Ill.

[21] Appl. No.: 896,155

[22] Filed: Jun. 10, 1992

[51] Int. Cl.$^5$ ............................................. B62J 17/00
[52] U.S. Cl. ...................................... 280/828; 280/272; 280/288.4; 296/78.1; D12/111; D12/126
[58] Field of Search ............ 280/827, 828, 272, 288.4, 280/304.3; 446/440, 470; 296/177, 78.1; D12/111, 110, 126, 127

[56] References Cited

U.S. PATENT DOCUMENTS

| | | | |
|---|---|---|---|
| D. 93,008 | 8/1934 | Ely | D12/111 |
| D. 138,304 | 7/1944 | Boynton | D12/111 |
| D. 149,408 | 4/1948 | Fuhs | D12/108 |
| D. 166,693 | 9/1951 | Lines | D12/108 |
| D. 170,610 | 10/1953 | Sebel | D12/108 |
| D. 203,146 | 12/1965 | Ryan | D12/110 |
| D. 237,701 | 11/1975 | Vachon | D12/111 |
| D. 240,418 | 7/1976 | Hirano et al. | D12/111 |
| D. 243,754 | 3/1977 | Silva, Jr. | D12/111 |
| D. 243,755 | 3/1977 | Silva, Jr. | D12/111 |
| D. 245,002 | 7/1977 | Carpenter et al. | D12/111 |
| D. 245,770 | 9/1977 | Brightbill | D12/126 |
| D. 246,170 | 10/1977 | Powers | D12/111 |
| D. 246,779 | 12/1977 | Cognata | D12/126 |
| D. 250,329 | 11/1978 | Breen | D12/126 |
| D. 267,560 | 1/1983 | Matsue | D12/110 |
| D. 270,047 | 8/1983 | Kataoka et al. | D12/110 |
| D. 273,100 | 3/1984 | Ziegler | D12/111 |
| D. 273,854 | 5/1984 | Ishiyama | D12/110 |
| D. 275,469 | 9/1984 | Morioka et al. | D12/110 |
| D. 291,187 | 8/1987 | Smith et al. | D12/111 |
| D. 291,291 | 8/1987 | Voytko et al. | D12/111 |
| D. 291,292 | 8/1987 | Smith et al. | D12/111 |
| D. 294,338 | 2/1988 | Yamada et al. | D12/110 |
| D. 295,274 | 4/1988 | Matsuzaki et al. | D12/110 |
| D. 299,016 | 12/1988 | Kitagawa et al. | D12/110 |
| D. 299,447 | 1/1989 | Sakuma et al. | D12/110 |
| D. 299,816 | 2/1989 | Maruyama et al. | D12/110 |
| D. 311,507 | 10/1990 | Sasaki et al. | D12/110 |
| D. 312,807 | 12/1990 | Kohama et al. | D12/110 |
| D. 313,380 | 1/1991 | Imai et al. | D12/110 |
| D. 314,167 | 1/1991 | Kolter et al. | D12/110 |
| D. 321,849 | 11/1991 | Abe et al. | D12/110 |
| D. 326,247 | 5/1992 | Hess | D12/111 |
| 642,269 | 1/1900 | Smith | 280/279 |
| 691,597 | 3/1901 | Christiansen | 280/271 |
| 1,230,801 | 6/1917 | Schriver | 280/271 |
| 1,498,677 | 6/1924 | Bemis et al. | 280/87.021 |
| 2,126,752 | 8/1938 | Devine et al. | 280/304.3 |
| 2,401,245 | 5/1946 | Hobbs | 89/36.09 |
| 2,513,496 | 7/1950 | Kranz | 280/304.3 |
| 2,575,292 | 11/1951 | Persons | 280/304.3 |
| 2,761,689 | 9/1956 | Becker | 280/1.21 |
| 3,210,889 | 10/1965 | Lyman | 446/404 |
| 3,416,837 | 12/1968 | Saunders | 280/304.3 |

(List continued on next page.)

FOREIGN PATENT DOCUMENTS 2213786  8/1989  United Kingdom ............... 296/78.1

OTHER PUBLICATIONS

Hedstrom 1985 catalog, pp. 4–9.
Brochure, Honda "1991 CBR600F2".
Brochure, Honda "1991 XR200R, XR100R, XR80R and Z50R".
Catalogue, AMF, Even Knievel Line, Spirited New Evel Knievel Styles for 1976 (See models L-9240, E-992, E-966).
Catalogue, AMF, Junior, 1977 Juvenile Wheel Goods, (See models G-992, G-986).

(List continued on next page.)

Primary Examiner—Margaret A. Focarino
Assistant Examiner—Kevin Hurley
Attorney, Agent, or Firm—Willian Brinks Hofer Gilson & Lione

[57] ABSTRACT

A bicycle with simulated motorcycle parts includes a shroud attachable to the bicycle. The shroud has a center portion simulating a gas tank and a rear fender portion extending over the rear wheel. The shroud is configured to fit around the seat tube of the bicycle and preferably completely covers the top tube of the bicycle. In one embodiment, a fairing mounted in front of the handlebars simulates a fairing on a motorcycle.

21 Claims, 8 Drawing Sheets

5,314,207
Page 2

U.S. PATENT DOCUMENTS

| | | | |
|---|---|---|---|
| 3,690,721 | 9/1972 | Herbert | 296/78.1 |
| 3,891,265 | 6/1975 | Blackburn | 296/78.1 |
| 3,902,740 | 9/1975 | Lucier et al. | 280/304.3 |
| 4,006,915 | 2/1977 | Parker | 280/271 |
| 4,022,487 | 5/1977 | Leahy | 296/78.1 |
| 4,066,290 | 1/1978 | Weigert et al. | 296/78.1 |
| 4,423,901 | 1/1984 | Shumard et al. | 296/78.1 |
| 4,534,578 | 8/1985 | Keller | 280/288.2 |
| 4,575,189 | 3/1986 | Johnson | 280/288.4 |
| 4,613,146 | 9/1986 | Sharp et al. | 280/288.2 |
| 4,655,497 | 4/1987 | Mallett | 296/78.1 |
| 4,735,592 | 4/1988 | Griffin | 280/828 |
| 4,739,851 | 4/1988 | Perego | 180/65.1 |
| 4,776,624 | 10/1988 | Sakuma et al. | 296/1.1 |
| 4,790,555 | 12/1988 | Nobile | 296/78.1 |
| 4,813,583 | 3/1989 | Carpenter | 224/30 R |
| 4,887,827 | 12/1989 | Heggie | 280/272 |
| 4,906,086 | 3/1990 | Imai et al. | 359/844 |

OTHER PUBLICATIONS

Catalogue, AMF, Roadmaster, Bicycles for 1977 (See models M-9224, M-9226, M-9236, M-9234).

Catalogue, AMF, 1978 Juvenile Wheel Goods (See models A-992, A-905).

Catalogue, AMF, Roadmaster, Bicycles for 1978 (See models P-9240, P-9216, P-9234, P-9214).

Catalogue, AMF, Junior, Wheel Goods for 1979 (See model B-905).

Catalogue, AMF, Roadmaster, Bicycles for 1979 (See models R-9214, R-9234, R-9238).

Catalogue, Bicycles for 1975 (See model K-9234).

Catalogue, AMF, Junior, 1976 Juvenile Wheel Goods (See model E-986).

Catalogue, AMF, Roadmaster, Bicycle for 1976 (See models L-9230, L-9234, L-9238, L-9236).

BICYCLE WITH SIMULATED MOTORCYCLE PARTS

BACKGROUND OF THE INVENTION

The present invention relates to a bicycle with simulated motorcycle parts, and more particularly to a shroud or body shell that can fit over the top tube and around the seat post of a child's bicycle to make the bicycle look like a motorcycle.

Over the years, a number of attachments to bicycles to simulate motorcycle parts have been proposed. For example, a simulated gas tank affixed to the top tube of a bicycle has been known.

U.S. Pat. No. 3,210,889 to Lyman discloses a simulated engine which mounts over the rear wheel of a bicycle.

U.S. Pat. No. 1,498,677 to Bemis et al. discloses a child's walking bicycle that has a body plate mounted between the frame members with an illustration of a motorcycle engine stenciled or printed thereon.

Other attachments to be added to a tricycle for simulating an airplane, rocket ship, submarine or other vehicles are disclosed in U.S. Pat. No. 2,761,689 to Becker.

A number of design patents disclose bicycles or parts therefore which appear to simulate motorcycles and parts thereof. See U.S. Pat. Nos. D 166,693; D 170,610; D 203,146; D 245,002; D 246,170; D 246,779; D 250,329; and D 291,292. Improvements can still be made, however, to provide simple attachments that can be added to a conventional child's bicycle that will make the bicycle more realistically stimulate a motorcycle.

SUMMARY OF THE INVENTION

Attachments have been invented which can be added to a bicycle to make it more realistically simulate a motorcycle. In one aspect, the invention comprises a shroud attachable to a bicycle that includes a center portion simulating a gas tank, the center portion being configured to fit around the seat tube of the bicycle, a rear fender portion for extending over the rear wheel of the bicycle and a front portion for attaching the shroud to a head tube of a bicycle.

In another aspect the invention comprises a bicycle with attachments for simulating a motorcycle, the attachments comprising a simulated motorcycle gas tank mounted over the top tube and around the seat tube of a bicycle, a rear fender extending over the bicycle rear wheel, a fender extending over the front wheel and a fairing mounted in front of the handlebars of the bicycle.

Since the gas tank portion of the attachments fit with other body shell members to cover the top tube of the bicycle and surround the seat tube, the attachments more realistically simulate a motorcycle. Also, the attachment designs accommodate adjustment of the height of the bicycle seat to accommodate a growing child.

These and other advantages, as well as the invention itself, will be best understood in light of the drawings, a brief description of which follows.

DETAILED DESCRIPTION OF THE DRAWINGS AND PREFERRED EMBODIMENTS OF THE INVENTION

Figure 7:
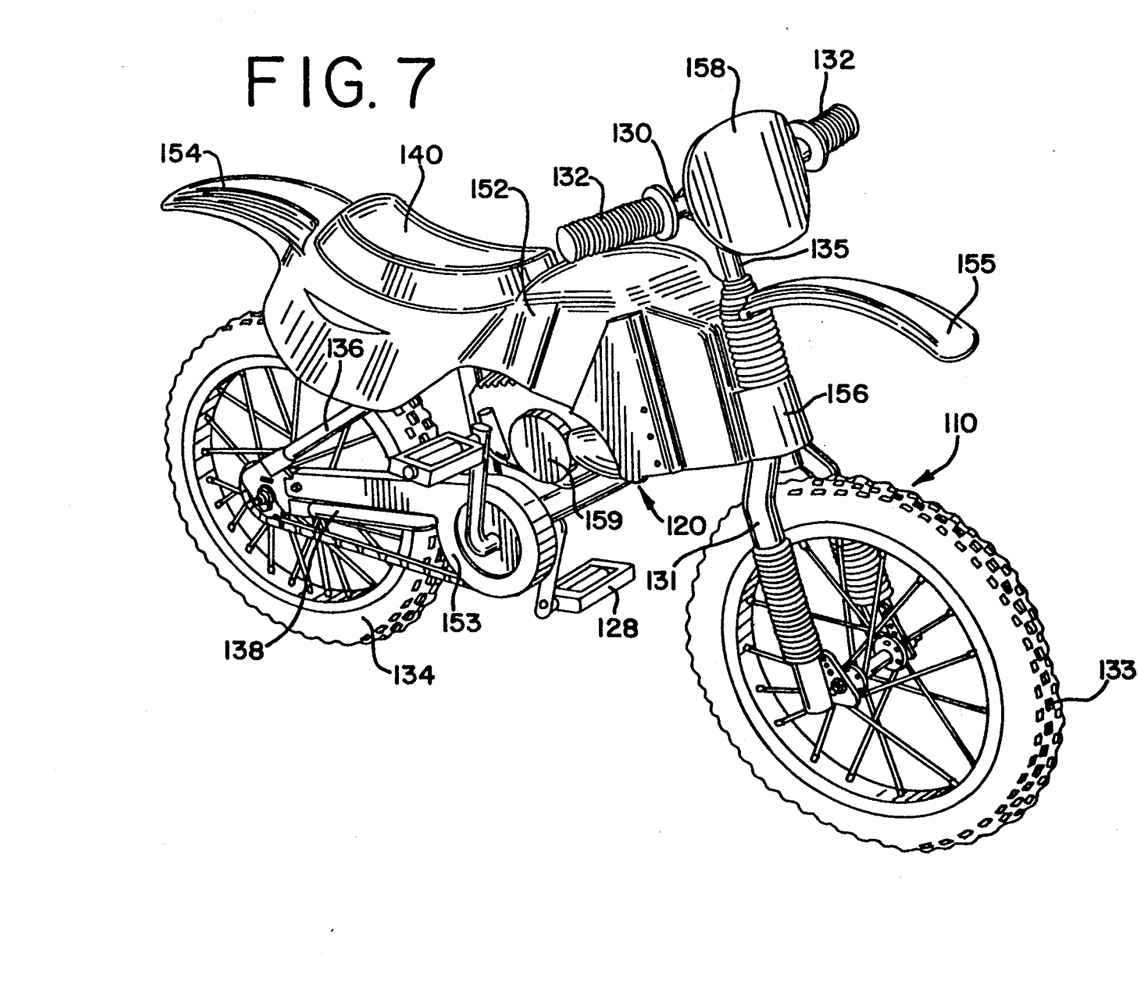
FIG. 7 is a perspective view of a bicycle with attachments of a second preferred embodiment of the invention.
Figure 8:
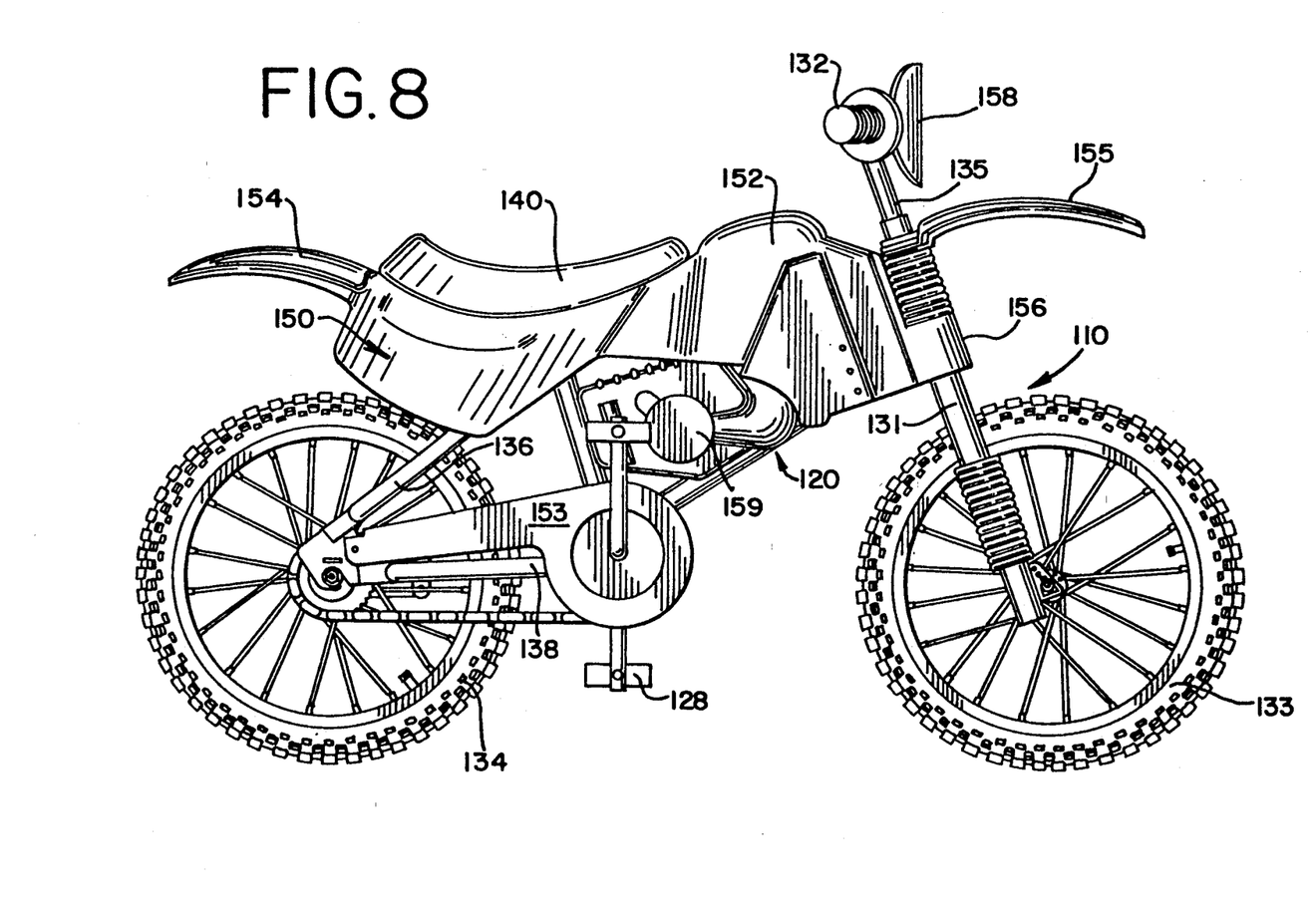
FIG. 8 is a side elevational view of the bicycle and attachments of FIG. 7.
Figure 9:
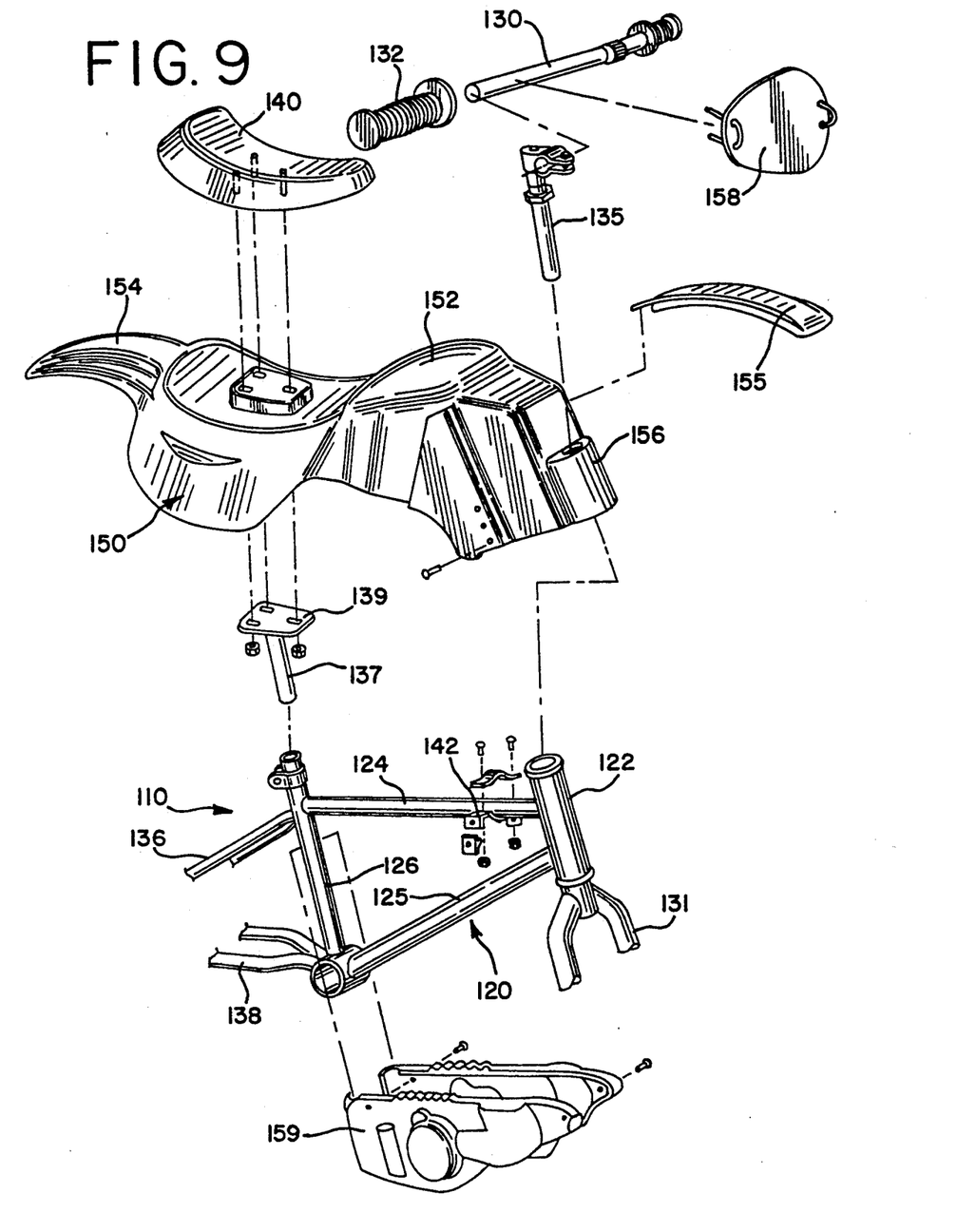
FIG. 9 is an exploded view of the bicycle and attachments of FIG. 7.
Figure 10:
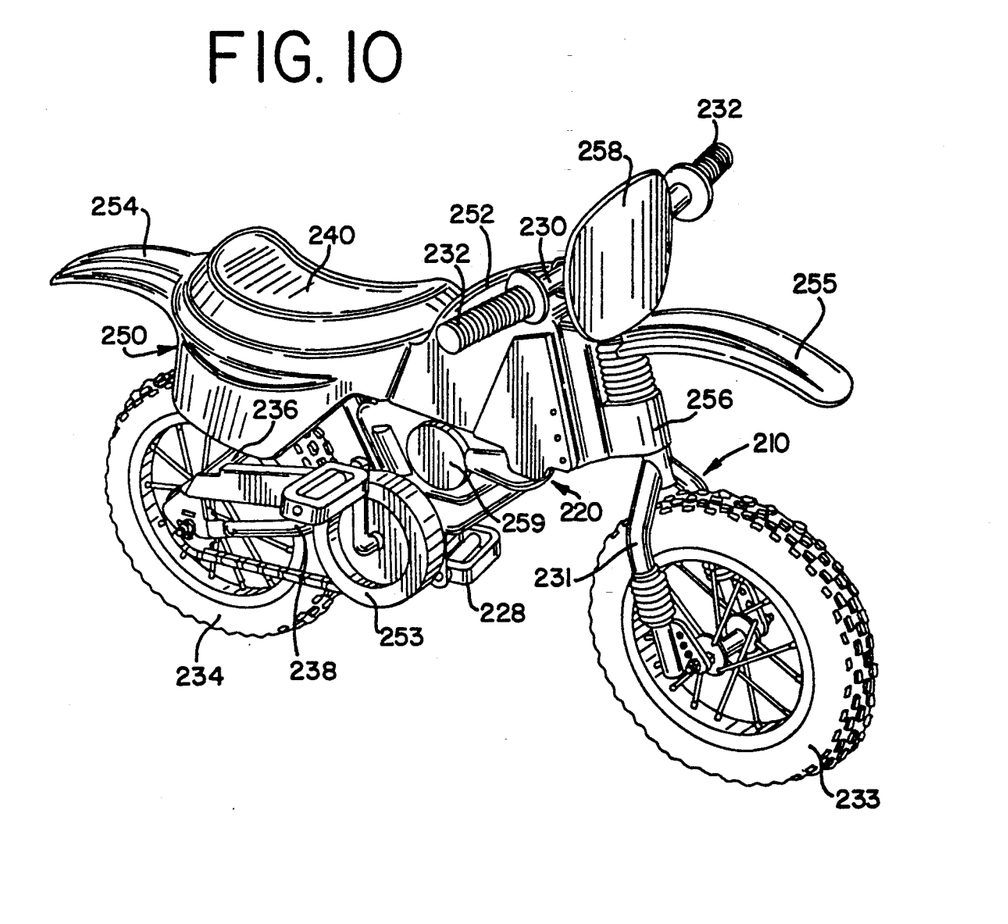
FIG. 10 is a perspective view of a bicycle with attachments of a third preferred embodiment of the invention.

There are three preferred embodiments of the present invention, each designed for use with a different size child's bicycle. The first preferred embodiment, shown in FIGS. 1-6, is designed for a 20" bicycle. The second preferred embodiment, shown in FIGS. 7-9, is designed for a 16" bicycle. The third preferred embodiment, shown in FIG. 10, is designed for use with a 12" bicycle.

In each embodiment, the bicycle is of a standard design. In fact, one of the advantages of the present invention is that it can be used on standard bicycles, with the further advantage that the attachments are disconnectably secured to the bicycle so that they may be removed, leaving the bicycle in its conventional form.

Figure 2:
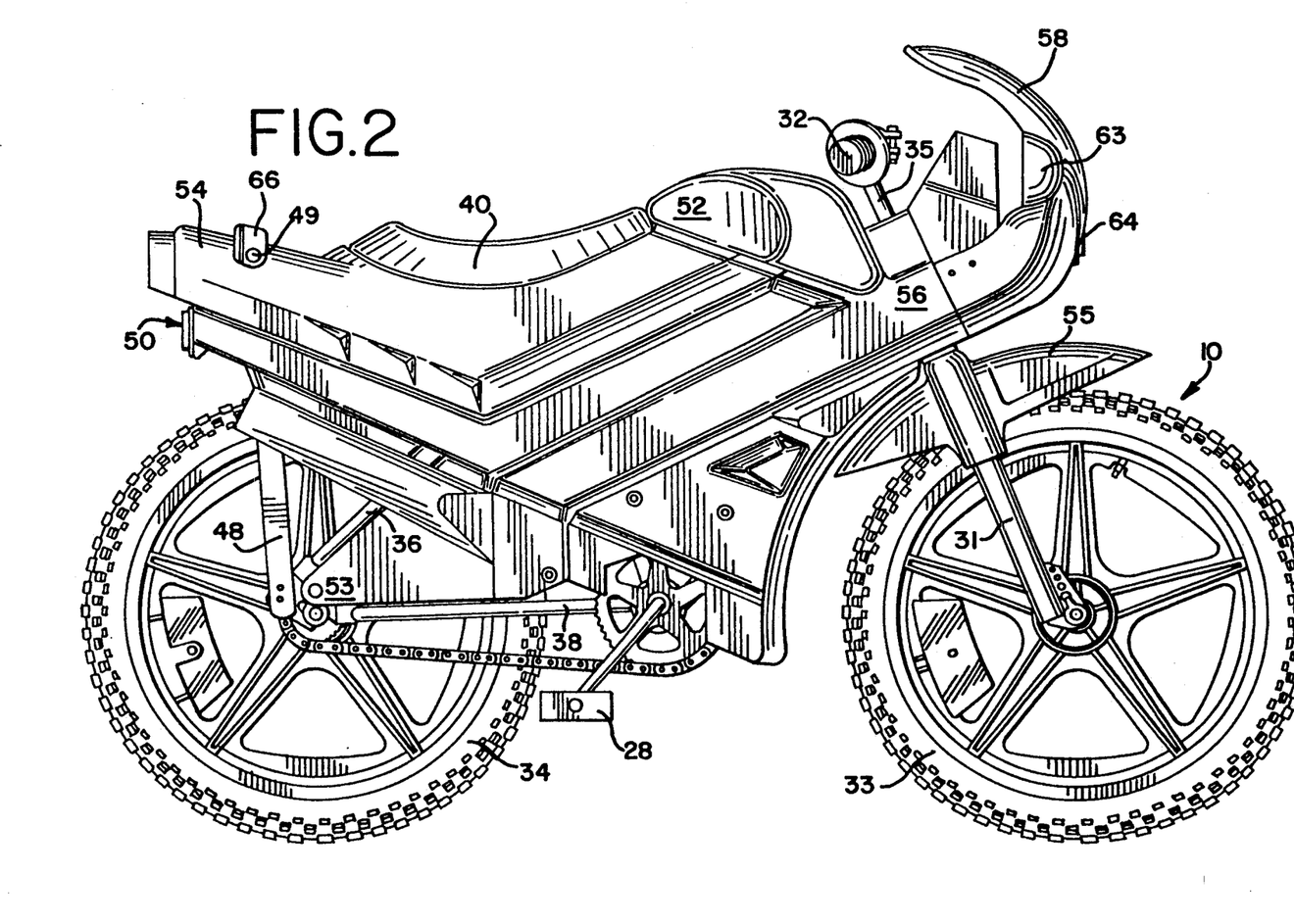
FIG. 2 is a side elevational view of the bicycle and attachments of FIG. 1.
Figure 3:
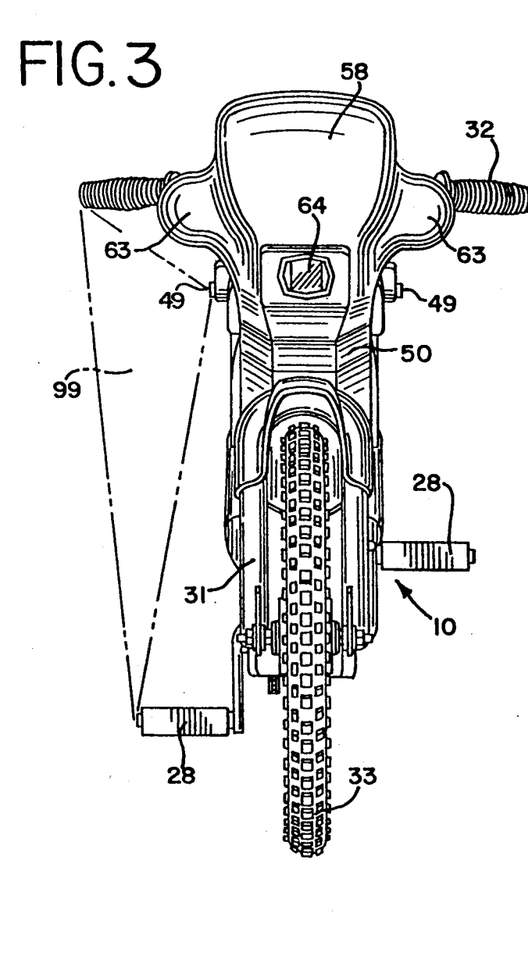
FIG. 3 is a front elevational view of the bicycle and attachments of FIG. 1
Figure 4:
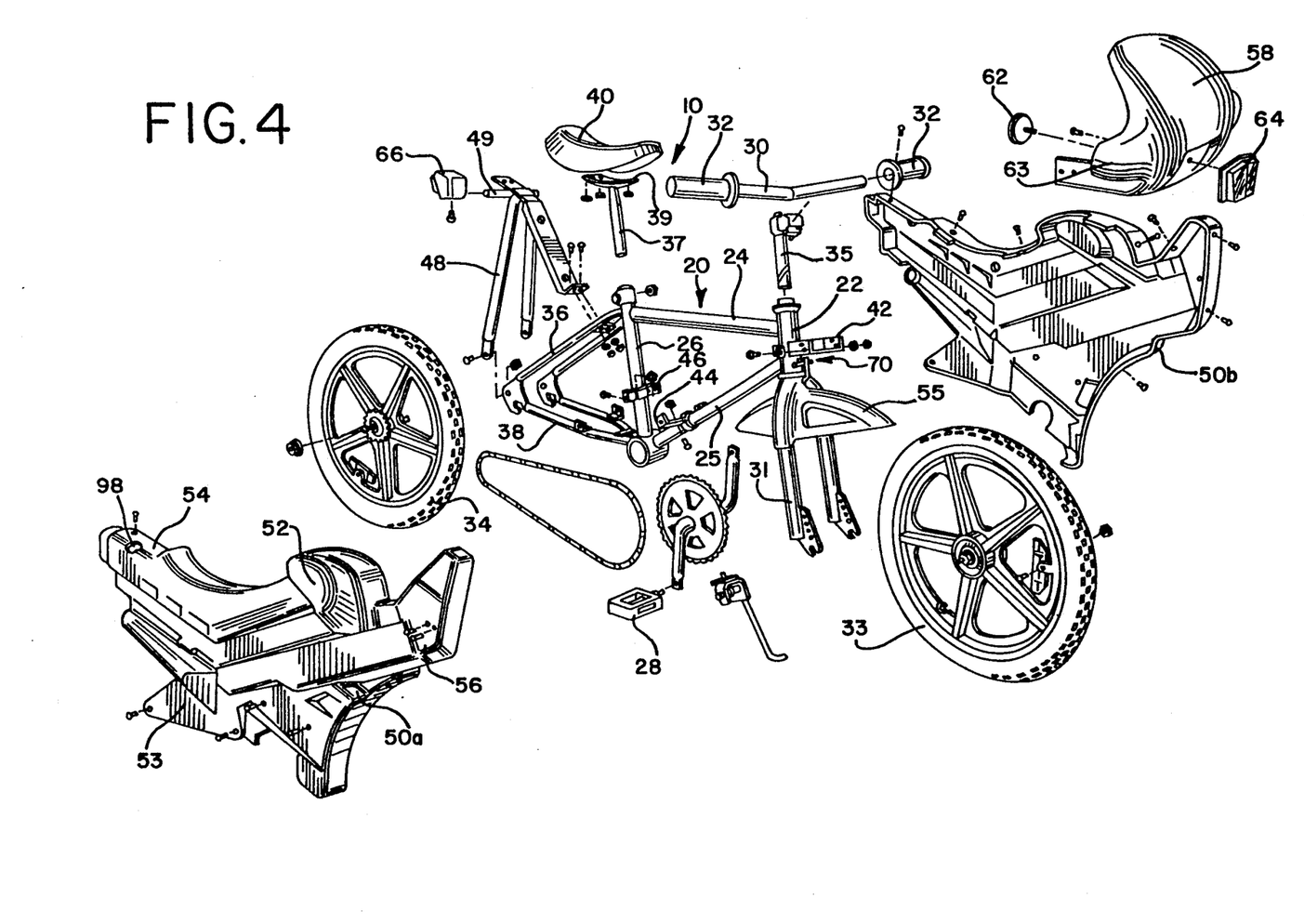
FIG. 4 is an exploded view of the bicycle and attachments of FIG. 1.
Figure 5:
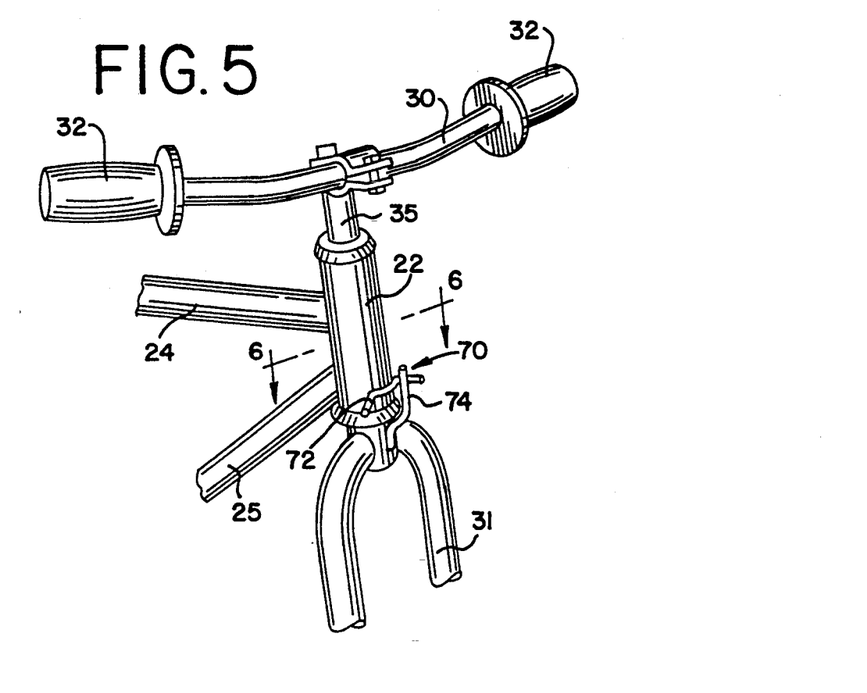
FIG. 5 is an enlarged perspective view of a head section of the bicycle of FIG. 1 without the motorcycle parts to show a turning limiter feature of the first embodiment.

In the embodiment shown in FIGS. 1-6, the bicycle 10 and attachments simulate a motorcycle sometimes referred to as a "cafe racer." As best seen in FIG. 4, the bicycle 10 includes a frame 20 including a head tube 22, a top tube 24, a down tube 25, a seat tube 26 and crank pedals 28. The bicycle 10 also includes a front wheel 33 mounted on a front fork 31 pivotally mounted in the head tube 22, with handlebars 30 attached to the front fork 31 via a stem 35 for steering the bicycle 10, a rear wheel 34 mounted on seat stay 36 and chain stay 38 attached to frame 20, and a seat 40 mounted to the seat tube 26 at an adjustable height on a seat post 37. These and the other bicycle 10 components not mentioned are standard, and constructed in a standard fashion.

The seat 40 is secured to the seat post 37 in a fixed manner such that the seat is prevented from pivoting on the seat post 37. In the preferred embodiments, the seat is affixed to a seat plate 39 welded to the top of the seat post 37.

The attachments to simulate a motorcycle include a shroud 50 (FIG. 1), a front fender 55 and a fairing 58 mounted in front of the handlebars 30. As best seen in FIG. 4, the shroud 50 is a plastic molded body shell. In the first preferred embodiment, it is made from two halves 50a and 50b that are mounted to the frame 20 by brackets 42, 44, 46 and 48 so as to fit around the seat tube 26 and over the top tube 24. In the preferred embodiment, the body shell 50 completely covers the top tube 24 and down tube 25.

Figure 1:
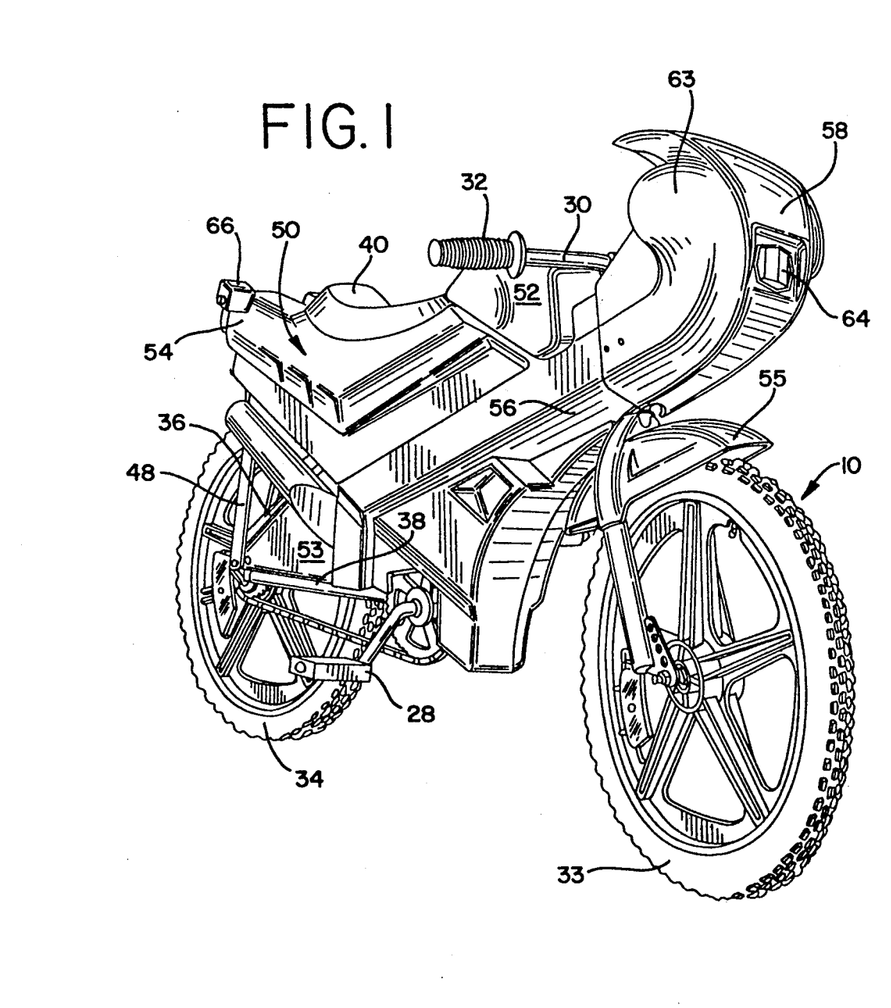
FIG. 1 is a perspective view of a bicycle with attachments of a first preferred embodiment of the invention.

The shroud 50 includes a center portion 52 simulating a gas tank, a rear fender portion 54 extending over the rear wheel 34 of the bicycle 10 and a front portion 56 for attaching the shroud 50 to the head tube 22. The center portion 52 also simulates the engine portion of a cafe racer motorcycle, and has a concave, contoured upper surface configured to follow and closely match the contour of the lower outer surface of seat 40 of the bicycle 10. Thus, as seen in FIGS. 1-3, the bicycle seat 40 appears as an integral part of the design of the simulated motorcycle. In the preferred embodiment, the shroud or body shell 50 comprises the chain guard 53 for the bicycle.

The fairing 58 preferably comprises a molded plastic member that attaches to the shroud 50 to extend the contour lines of the shroud 50, adding to the aesthetic appearance of the simulated motorcycle design. In this first embodiment, the fairing 58 does not pivot with the handlebars 30. The fairing 58 connects to the shroud 50 and frame 22 by use of the bracket 42. As best seen in FIGS. 1 and 3, the fairing 58 includes a reflector 64 mounted to simulate a motorcycle headlight. As seen in FIG. 4, two mirrors 62 (only one of which is shown) are mounted facing backwards on side extensions 63 of the fairing 58, again simulating the design of a motorcycle fairing.

Figure 6A:
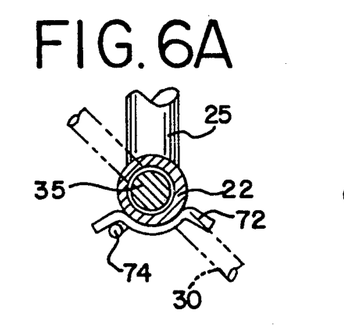
FIGS. 6A, 6B and 6C are sectional views taken along line 6—6 of FIG. 5, showing the head section of FIG. 5 with the handlebars in three different positions.
Figures 6B, 6C:
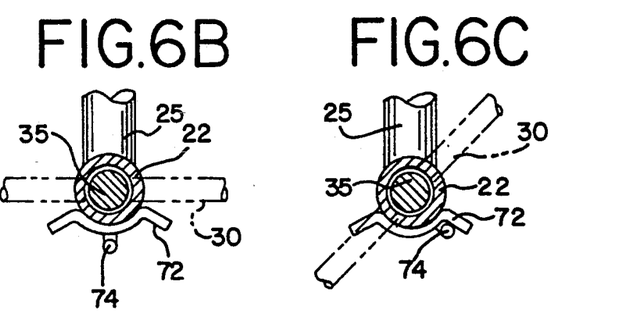

As best shown in FIGS. 5 and 6A-C, where the shroud 50, front fender 55 and fairing 58 have been omitted, the bicycle 10 includes a turning limiter 70 for limiting the degree of pivotability of the front fork 31. This provides a safety feature for the bicycle 10 with the described attachments in that the turning limiter 70 prevents the handlebars 30 from turning so far as to create pinch points with the fairing 58 or gas tank portion of the shroud 50. The turning limiter 70 comprises an arcuate rod 72 mounted horizontally on the head tube 22 and a hook 74 extending vertically from the front fork 31. As shown in FIGS. 6A-6C, as the handlebars 30 (shown in dashed lines in their relative position above the head tube) are turned from side to side, the hook 74 contacts the stops provided by the arcuate rod 72, limiting the handlebar 30 from turning further.

As best seen in FIG. 4, the front fender 55 rests on top of the crown of front fork 31 and includes a hole so that the hook 74 may pass upwardly through the fender 55.

The rear bracket 48, mounted to the seat stay 36, is provided with side extensions 49, best seen in FIG. 4, extending from the bicycle 10 on each side thereof and through holes 98 formed on each side of the body shell or shroud 50. The purpose of the side extensions 49 is to cooperate with handlebars 30 and crank pedals 28 to prevent the shroud 50 from contacting the ground if the bicycle 10 should be tipped over. As best seen in FIG. 3, the extremities of the handlebars 30 and peddles 28 protrude from the side of bicycle 10 quite a bit further than the shroud 50. Extensions 49 are wider than shroud 50, and the ends of extensions 49 provide a third point on each side of the bicycle, thus defining a plane 99. Neither of these planes intersect the body shell 50. The extensions are preferably located on the upper-rear portion of the bicycle, above the axle of the rear wheel 35 and behind the pedal 28. The position and length of extensions 49 should be such that if one end of the handlebars 30, one pedal 28 and one extension 49 were lying on the ground, the rest of the bicycle 10 and attachments, including the rear fender 54, would all be above the plane of the ground. Simulated turn signal lights 66 are attached to side extensions 49 to cosmetically cover the extensions as well as to add realism to the simulated motorcycle design.

Since the shroud 50 is attached to the frame 20 by brackets 42, 44, 46 and 48, in this first embodiment the height of the seat 40 is adjustable independent of the height of the simulated gas tank and engine.

In the preferred first embodiment, the handlebars 30 are generally straight, and have handlebar grips 32 to further simulate a motorcycle appearance. Also, preferably the wheels 33 and 34 have a "mag wheel" five pointed design.

The second preferred embodiment of the invention, FIGS. 7-9, utilizes many of the features of the first embodiment. Therefore, reference numbers for the components in the second embodiment that are also found in the first embodiment are the same last two digits, increased by an addend of 100. For example, the bicycle 110 has a frame 120, just as the bicycle 10 of the first embodiment has a frame 20.

The most noticeable difference in the second embodiment is that the shroud 150 is one unitary molded piece, rather than a two piece design, and a number plate 158 is used instead of the fairing. The number plate 158 attaches directly to the handlebars 130 by straps (FIG. 9) and thus pivots with the handlebars 130. The motorcycle design of the second embodiment is that of a "dirt bike" style of motorcycle. Thus, the front fender 155 is raised up higher and attaches between the top of head tube 122 and stem 135. The fender 155 is attached to a bracket that is either along side or used in place of the washer normally found at the top of head tube 122.

The shroud 150 has a center portion 152 simulating a gas tank. The center portion fits around the seat tube 126 of bicycle 110 and completely covers the top tube 124. In this embodiment, however, the shroud 150 is attached to the underside of seat 140 (FIG. 9) and moves up and down with adjustment to the height of seat 140. The center portion 152 is configured to follow the contour of the seat 140. Also, as with the first embodiment, rear fender portion 154 is integrally formed with the rest of the shroud 150. Also, the front portion 156 of the shroud 150 attaches to the head tube 122 of the bicycle 110. As best seen in FIG. 9, the front portion 156 of the shroud 150 includes a hole that allows the shroud 150 to slideably fit down over the head tube 122. A front bracket 142 attached to the top tube 124 is used to further attach the shroud 150 to the bicycle 110 and to set the height of the shroud 150. The front portion 156 has three holes on each side. Depending on the seat height, fasteners are used through one of the three sets of holes to connect the shroud 150 to bracket 142. In this fashion, the simulated gas tank 152 is adjustably connected to the frame 120 near the head tube 122 to allow the simulated gas tank to be adjusted in height with the seat height. Preferably, the unused holes are plugged.

In the second embodiment, the engine portion 159 of the attachment is not formed as part of the shroud 150, but as a separate piece, connected to the seat tube 126 of the bicycle. The engine portion 159 is a two part design with flanges that clamp around the seat tube 126 when the two parts are secured together.

The embodiment shown in FIGS. 7-9 does not include simulated rear turn signals, mag wheels or a turning limiter, though those features could be added if desired. Also, the bicycle's conventional chain guard 153 is used.

The third embodiment, shown in FIG. 10, is almost identical to the second embodiment. Therefore, the same reference numbers, increased by an addend of 100, have been used. The design of the shroud 250 and number plate 258 are modified slightly to fit a smaller bicycle 220, but otherwise attach and have the same components and function as the shroud 150 and number plate 158 of the second embodiment of the invention.

The shrouds 50, 150 and 250 are preferably molded of high density polyethylene or some other suitable plastic.

As can be seen from the figures, the shrouds and other attachments produce a bicycle with a very realistic motorcycle simulation. This is partly due to the fact that the shroud completely covers the top tube. Each of the shrouds and attachments are simple, and the attachments and brackets can be removed to result in a conventional bicycle if the simulated motorcycle design is no longer wanted.

It should be appreciated that the apparatus of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A combination of a bicycle and a shroud attachable to the bicycle to simulate a motorcycle, the bicycle comprising a frame having a seat tube and a seat mounted on a seat post within said seat tube, the seat having a contoured lower outer surface, the shroud comprising:
   a) a center portion simulating a gas tank, the center portion having a concave, contoured upper surface shaped to follow the contour of the bicycle seat lower outer surface;
   b) a rear fender portion for extending over a rear wheel of the bicycle; and
   c) a front portion for attaching the shroud to the frame of the bicycle.

2. The shroud of claim 1 wherein the combination completely covers a top tube of the bicycle.

3. The shroud of claim 1 wherein the combination is attachable to the underside of a bicycle seat.

4. The shroud of claim 1 wherein the combination is configured to be adjustably connected to the bicycle to allow the shroud to be adjusted in height with the bicycle seat height.

5. A bicycle having attachments to simulate a motorcycle,
   a) the bicycle comprising:
      (i) a frame including a heat tube, a top tube, a down tube, a seat tube and crank pedals,
      (ii) a front wheel mounted on a front fork pivotally mounted in said head tube,
      (iii) a rear wheel mounted on seat and chain stays attached to said frame,
      (iv) handlebars attached to said front fork for steering said bicycle, and
      (v) a seat mounted to said seat tube at an adjustable height; and
   b) the attachments comprising:
      (i) a simulated motorcycle gas tank mounted over the top tube and around the seat tube,
      (ii) a rear fender extending over the rear wheel,
      (iii) a front fender extending over the front wheel, and
      (iv) a fairing mounted in front of said handlebars;
   wherein the simulated gas tank and rear fender comprise parts of a body shell.

6. The bicycle and attachments of claim 5 further comprising a turning limiter for limiting the degree of pivotability of the front fork.

7. The bicycle and attachments of claim 6 wherein the turning limiter comprises an arcuate rod mounted horizontally on the head tube and a hook extending vertically from the front fork.

8. The bicycle and attachments of claim 5 further comprising brackets attached to the frame for mounting a shroud simulating the gas tank and rear fender of a motorcycle.

9. The bicycle and attachments of claim 5 further including a rear mounting bracket attached to the seat stay, the rear mounting bracket including side extensions which cooperate with the handlebars and the crank pedals such that the outward ends of the extensions, crank pedals and handlebars prevent contact of the simulated gas tank with the ground in the event the bicycle falls on its side.

10. The bicycle and attachments of claim 5 wherein the attachments are disconnectably secured to the bicycle so that they may be removed to result in a conventional bicycle.

11. The bicycle and attachments of claim 5 wherein the front fender rests on the top of the fork crown.

12. The bicycle and attachments of claim 5 wherein the fairing comprises a reflector mounted to simulate a motorcycle headlight.

13. The bicycle and attachments of claim 5 wherein the body shell further simulates a motorcycle engine.

14. The bicycle and attachments of claim 5 wherein the body shell comprises a chain guard for the bicycle.

15. The bicycle and attachments of claim 9 wherein simulated turn signal lights are attached to the side extensions.

16. A bicycle with a plastic body shell to simulate a motorcycle; the bicycle comprising a frame, a front wheel, a rear wheel, handlebars and pedals mounted on said frame, and frame extensions extending from the bicycle from each side thereof; the body shell comprising a simulated gas tank and a rear fender extending over the rear wheel and having a hole through the body shell on each side thereof; the extensions being located behind the pedals and above the axle of the rear wheel and extending through said holes in said body shell, and sufficiently long compared to the width of the plastic body shell such that the extremities of the handlebars, pedals and frame extension on each side of the bicycle define a plane which does not intersect the body shell.

17. The bicycle of claim 16 further comprising a turning limiter to limit the pivotability of the handlebars with respect to the frame.

18. A bicycle with attachments to simulate a motorcycle,
   a) the bicycle comprising:
      (i) a frame, including a head tube, seat tube and down tube,
      (ii) front and rear wheels rotatable mounted to said frame, (iii) and a bicycle seat with an adjustable height mounted on the seat tube; and b) the attachments comprising:

(i) a shroud having a simulated gas tank and rear fender portion, the shroud being attached to the bicycle seat and to the frame so as to be adjustable in height with height adjustments of the seat.

19. The bicycle and attachments of claim 18 wherein the shroud includes a front portion having a hole therethrough for slideably fitting over the head tube.

20. The bicycle and attachments of claim 18 further comprising a simulated engine separate from the shroud and attached to the frame.

21. The bicycle and attachments of claim 18 wherein the seat is secured to a seat post in a fixed manner such that the seat is prevented from pivoting on the seat post, the seat post being slideably mounted in said seat tube.

* * * * *

UNITED STATES PATENT AND TRADEMARK OFFICE
CERTIFICATE OF CORRECTION

PATENT NO. : 5,314,207
DATED : May 24, 1994
INVENTOR(S) : Camfield et al.

It is certified that error appears in the above-indentified patent and that said Letters Patent is hereby corrected as shown below:

ON THE TITLE PAGE

Under the heading "OTHER PUBLICATIONS", in the fifth line, delete "Even" and substitute therefor --Evel--.

COLUMN 5:
  Claim 2, line 48, delete "shroud" and substitute --combination-- therefor; and delete "combination" and substitute --shroud-- therefor.

Claim 3, line 50, delete "shroud" and substitute --combination-- therefor; and delete "combination" and substitute --shroud-- therefor.

Claim 4, line 52, delete "shroud" and substitute --combination-- therefor; and delete "combination" and substitute --shroud-- therefor.

Claim 5, line 59, delete "heat" and substitute therefor --head--.

Signed and Sealed this

Twenty-eight Day of February, 1995

Attest:

BRUCE LEHMAN

Attesting Officer

Commissioner of Patents and Trademarks